(12) United States Patent
Magai et al.

(10) Patent No.: US 8,311,368 B2
(45) Date of Patent: Nov. 13, 2012

(54) IMAGE-PROCESSING APPARATUS AND IMAGE-PROCESSING METHOD

(75) Inventors: Koichi Magai, Tokyo (JP); Hirotaka Shiiyama, Yokohama (JP); Hidetomo Sohma, Yokohama (JP); Tomomi Takata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1039 days.

(21) Appl. No.: 12/058,435

(22) Filed: Mar. 28, 2008

(65) Prior Publication Data

US 2008/0247675 A1   Oct. 9, 2008

(30) Foreign Application Priority Data

Apr. 4, 2007   (JP) ................................ 2007-098683

(51) Int. Cl.
*G06K 9/54* (2006.01)
(52) U.S. Cl. ........ 382/305; 382/151; 382/172; 382/190; 382/194; 382/195; 382/270; 382/295; 382/296; 382/297; 382/298
(58) Field of Classification Search .................. 382/305, 382/151, 172, 190, 194, 195, 270, 295–298
See application file for complete search history.

(56) References Cited

U.S. PATENT DOCUMENTS

| | | | | |
|---|---|---|---|---|
| 5,204,916 A * | 4/1993 | Hamilton et al. | ............. | 382/296 |
| 5,799,115 A * | 8/1998 | Asano et al. | .................. | 382/305 |
| 6,459,824 B1 * | 10/2002 | Lee et al. | ...................... | 382/305 |
| 6,493,705 B1 | 12/2002 | Kobayashi et al. | ............... | 707/3 |
| 6,549,683 B1 * | 4/2003 | Bergeron et al. | ............. | 382/298 |
| 6,754,667 B2 * | 6/2004 | Kim et al. | ............................. | 1/1 |
| 6,856,987 B2 | 2/2005 | Takata et al. | ...................... | 707/6 |
| 7,051,048 B2 | 5/2006 | Sohma et al. | .................. | 707/200 |
| 7,054,861 B2 | 5/2006 | Kobayashi et al. | ............... | 707/6 |
| 7,075,683 B1 | 7/2006 | Shiiyama | ...................... | 358/452 |
| 7,158,677 B2 * | 1/2007 | Wenzel et al. | ................ | 382/203 |
| 7,233,945 B2 | 6/2007 | Shiiyama | .......................... | 707/4 |
| 7,620,204 B2 * | 11/2009 | Porikli et al. | .................. | 382/103 |
| 7,684,648 B2 * | 3/2010 | Miyazawa et al. | ............. | 382/298 |
| 8,229,222 B1 * | 7/2012 | Silver et al. | .................... | 382/181 |
| 2003/0179933 A1 * | 9/2003 | Kato et al. | ..................... | 382/190 |

(Continued)

FOREIGN PATENT DOCUMENTS

CN   1881211 A   12/2006

(Continued)

OTHER PUBLICATIONS

Cordelia Schmid et al,Local grayvalue—retrieval, IEEE, 0162-8828, vol. 19, 1997, pp. 530-535.*

(Continued)

*Primary Examiner* — Jayesh A Patel
(74) *Attorney, Agent, or Firm* — Fitzpatrick, Cella, Harper & Scinto (57) ABSTRACT

When retrieving an image from an archive of stored images that is similar to an inputted image, an image-processing apparatus (200) extracts more than one characteristic point from the inputted image (S504), computes a characteristic amount for the characteristic points thus extracted (S505), and evaluates the fluctuation in the characteristic amount when a prescribed alteration is applied to the inputted image (S506). The image-processing apparatus selects a characteristic point from among the characteristic points thus extracted from the inputted image, and retrieves (S508) a stored image that is similar to the inputted image, in accordance with the characteristic amount of the characteristic point thus selected.

11 Claims, 10 Drawing Sheets

U.S. PATENT DOCUMENTS

| | | | | |
|---|---|---|---|---|
| 2003/0231806 A1* | 12/2003 | Troyanker | | 382/305 |
| 2004/0103101 A1* | 5/2004 | Stubler et al. | | 707/100 |
| 2004/0190775 A1* | 9/2004 | Miller | | 382/190 |
| 2005/0036712 A1* | 2/2005 | Wada | | 382/305 |
| 2005/0286767 A1* | 12/2005 | Hager et al. | | 382/190 |
| 2006/0110073 A1* | 5/2006 | Matsushita et al. | | 382/305 |
| 2006/0112088 A1 | 5/2006 | Kobayashi et al. | | 707/3 |
| 2006/0120627 A1 | 6/2006 | Shiiyama | | 382/305 |
| 2006/0122986 A1 | 6/2006 | Sohma | | 707/3 |
| 2006/0164702 A1 | 7/2006 | Shiiyama | | 358/537 |
| 2007/0122037 A1* | 5/2007 | Shiiyama | | 382/190 |
| 2007/0133907 A1* | 6/2007 | Yamamoto et al. | | 382/305 |
| 2007/0143272 A1* | 6/2007 | Kobayashi | | 707/3 |
| 2008/0013836 A1* | 1/2008 | Nakamura et al. | | 382/209 |
| 2008/0069450 A1* | 3/2008 | Minami et al. | | 382/199 |
| 2008/0089615 A1 | 4/2008 | Shiiyama | | 382/305 |
| 2009/0041340 A1* | 2/2009 | Suzuki et al. | | 382/159 |

FOREIGN PATENT DOCUMENTS

| | | |
|---|---|---|
| EP | 0 866 424 | 9/1998 |
| EP | 866424 A2 * | 9/1998 |
| EP | 1 199 650 | 4/2002 |
| JP | 08-249349 | 9/1996 |
| JP | 09-44665 | 2/1997 |

OTHER PUBLICATIONS

Cordelia Scahmid et al, Local garyvalue—retrieval, IEEE, 0162-8828, vol. 19, 1997, pp. 530-535.*

Chinese Office Action dated Dec. 4, 2009 in corresponding Chinese Application No. 2008100904208, and English-language translation thereof.

C. Schmid and R. Mohr, "Local grayvalue invariants for image retrieval," IEEE Trans. PAMI., vol. 19, No. 5, pp. 530-535, 1997.

C. Harris and M. J. Stephens, "A combined corner and edge detector," in Alvey Vision Conference, pp. 147-151, 1988.

J. J. Koenderink and A. J. van Doorn, "Representation of local geometry in the visual system," Biological Cybernetics, vol. 55, pp. 367-375, 1987.

U.S. Appl. No. 12/116,113 (Hidetomo Sohma, et al), pending.

U.S. Appl. No. 12/106,197 (Hirotaka Shiiyama, et al), pending.

European Search Report in corresponding European Application No. 08154111.2, dated Jul. 7, 2008.

* cited by examiner

| 0 | 0.0002 | 0.0011 | 0.0018 | 0.0011 | 0.0002 | 0 |
|---|---|---|---|---|---|---|
| 0.0002 | 0.0029 | 0.0131 | 0.0216 | 0.0131 | 0.0029 | 0.0002 |
| 0.0011 | 0.0131 | 0.0586 | 0.0966 | 0.0586 | 0.0131 | 0.0011 |
| 0.0018 | 0.0216 | 0.0966 | 0.1592 | 0.0966 | 0.0216 | 0.0018 |
| 0.0011 | 0.0131 | 0.0586 | 0.0966 | 0.0586 | 0.0131 | 0.0011 |
| 0.0002 | 0.0029 | 0.0131 | 0.0216 | 0.0131 | 0.0029 | 0.0002 |
| 0 | 0.0002 | 0.0011 | 0.0018 | 0.0011 | 0.0002 | 0 |

FIG. 8

| 0 | 0 | 0 | 0.0001 | 0.0002 | 0.0001 | 0 | 0 | 0 |
|---|---|---|---|---|---|---|---|---|
| 0 | 0 | 0.0006 | 0.0021 | 0.0022 | 0.0021 | 0.0006 | 0 | 0 |
| 0 | 0.0006 | 0.0050 | 0.0135 | 0.0263 | 0.0135 | 0.0050 | 0.0006 | 0 |
| 0.0001 | 0.0021 | 0.0135 | 0.0639 | 0.0810 | 0.0639 | 0.0135 | 0.0021 | 0.0001 |
| 0.0002 | 0.0022 | 0.0263 | 0.0810 | 0.1554 | 0.0810 | 0.0263 | 0.0022 | 0.0002 |
| 0.0001 | 0.0021 | 0.0135 | 0.0639 | 0.0810 | 0.0639 | 0.0135 | 0.0021 | 0.0001 |
| 0 | 0.0006 | 0.0050 | 0.0135 | 0.0263 | 0.0135 | 0.0050 | 0.0006 | 0 |
| 0 | 0 | 0.0006 | 0.0021 | 0.0022 | 0.0021 | 0.0006 | 0 | 0 |
| 0 | 0 | 0 | 0.0001 | 0.0002 | 0.0001 | 0 | 0 | 0 |

IMAGE-PROCESSING APPARATUS AND IMAGE-PROCESSING METHOD

BACKGROUND OF THE INVENTION

1. Field of the Invention

The present invention relates to an image-processing apparatus and an image-processing method that retrieves an image that is similar to an image that is inputted thereto.

2. Description of the Related Art

A variety of technologies for retrieving a similar image have been proposed. For example, there is a method of dividing an image into a plurality of blocks, and employing an image characteristic amount, i.e., a representative color, of each respective block, to perform a pattern match, thereby using a position information of the color to retrieve the similar image, e.g., Cited Patent Reference 1. The method disclosed according to the Cited Patent Reference 1, however, requires calculating the characteristic amount from the image overall at the time that the retrieval is conducted, and consequently, the retrieval becomes complicated in such a circumstance as when a specified object is cut out from within the image, or when a background color changes, for example.

A method has accordingly been proposed that uses a localized characteristic amount, i.e., a local characteristic amount, rather than the characteristic amount of the image overall, to retrieve the similar image. Such a method commences by extracting a characteristic point, i.e., a local characteristic point, from the image. The method continues by calculating a characteristic amount with regard to the local characteristic point, i.e., the local characteristic amount, from the local characteristic point and image information in a vicinity thereof. The retrieval of the image is performed by matching the respective local characteristic quantities.

A method has been proposed that is capable of retrieval with a high degree of precision with regard to such a technique as the foregoing that uses the local characteristic amount, even when an image is rotated, by defining the local characteristic amount as an amount that is configured of a plurality of elements that are invariant by rotation, e.g., Cited Non-patent Reference 1. In a similar fashion, there is also a method that uses the local characteristic amount to match a position of the image by defining the local characteristic amount as the amount that is configured of the plurality of elements that are invariant by rotation, e.g., Cited Patent Reference 2.

The Cited Patent Reference 1, the Cited Patent Reference 2, and the Cited
Non-patent Reference 1 are as follows:

Cited Patent Reference 1: Japanese Patent Laid-Open No. 08-249349.
Cited Patent Reference 2: Japanese Patent Laid-Open No. 09-44665.
Cited Non-patent Reference 1: C. Schmid and R. Mohr, "Local grayvalue invariants for image retrieval," IEEE Trans. PAMI., Vol.19, No.5, pp. 530-535, 1997.

Figure 10:
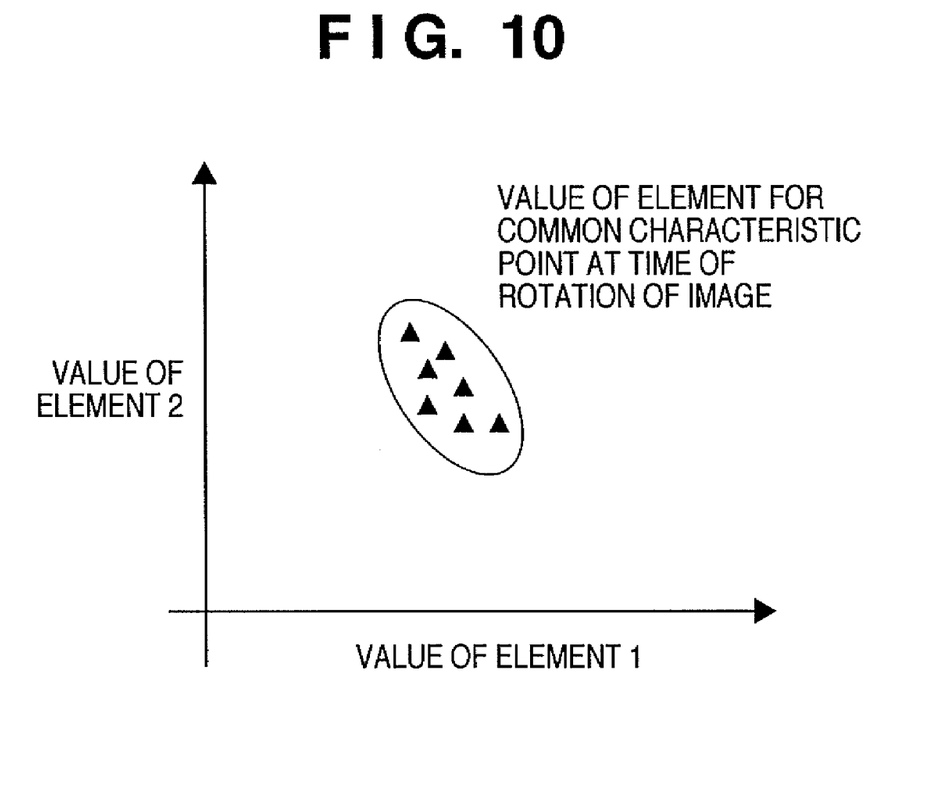
FIG. 10 depicts an example of a fluctuation of a local characteristic amount that is defined as being invariant by rotation.

With regard to the method disclosed in either the Cited Patent Reference 2 or the Cited Non-patent Reference 1, however, in fact, a fluctuation arises in the local characteristic amount that is defined as being invariant by rotation according to the present method, the fluctuation being caused by a noise that emerges when the image is rotated. FIG. 10 depicts an example of the fluctuation in the local characteristic amount that is defined as being invariant by rotation. FIG. 10 depicts the fluctuation in the local characteristic amount that is defined in the Cited Non-patent Reference 1 as a scatter diagram. The diagram plots seven elements of the local characteristic amount that are calculated at a common point when an image is rotated from 0 degrees through to 90 degrees, at 15 degree intervals. A problem that results from the fluctuation in the local characteristic amount that is apparent in FIG. 10 is deterioration in the precision of the image retrieval.

SUMMARY OF THE INVENTION

An objective of the present invention is to provide an improved image-processing apparatus in which fluctuation in local characteristic amounts caused by performing a prescribed alteration on the image is taken into account.

According to one aspect of the present invention, there is provided an image-processing apparatus, comprising: an extraction unit configured to extract a plurality of characteristic points from an input image; a characteristic-amount computation unit configured to compute a characteristic amount for each characteristic point extracted by the extraction unit; an evaluation unit configured to evaluate the effect that a prescribed alteration to the input image would have on each characteristic amount calculated by the characteristic-amount calculation unit; a selection unit that selects, based on the results of the evaluation unit, at least one characteristic point from the plurality of characteristic points to use for image retrieval; and a retrieval unit that retrieves an image from among a plurality of stored images using at least one characteristic point selected by the selection unit.

According to another aspect of the present invention, there is provided an image-processing method, comprising: extracting a plurality of characteristic points from an input image; computing a characteristic amount with regard to each extracted characteristic point; and evaluating the effect that a prescribed alteration to the input image would have on each characteristic amount; selecting, based on the results of the evaluation, at least one characteristic point from the plurality of characteristic points to use for image retrieval; and retrieving an image from among a plurality of stored images using the selected at least one characteristic point.

Further features of the present invention will become apparent from the following description of exemplary embodiments (with reference to the attached drawings).

DESCRIPTION OF THE EMBODIMENTS

Following is a detailed description of preferred embodiments for carrying out the present invention, with reference to the attached drawings.

[First Embodiment]

Figure 1:
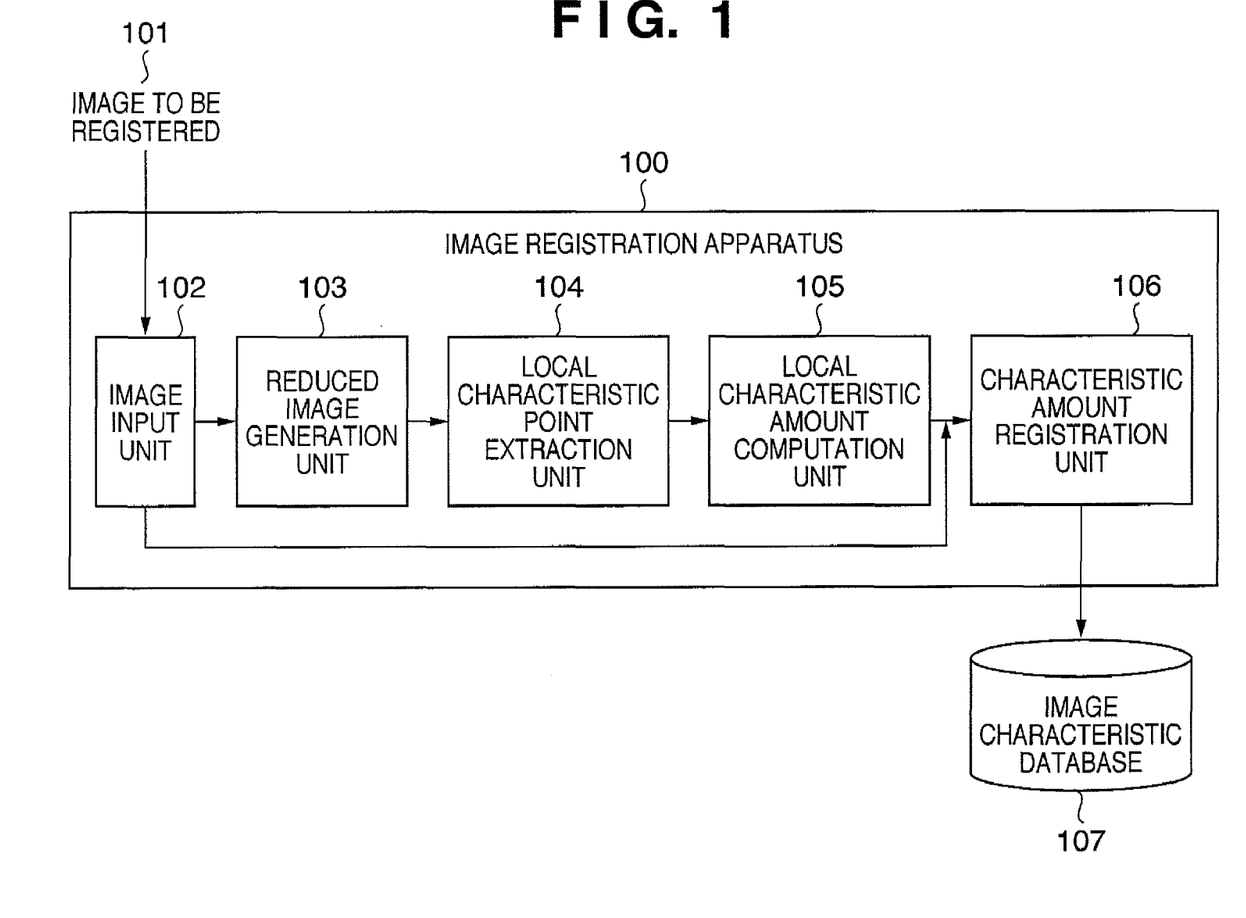
FIG. 1 is a block diagram depicting a configuration example of an image-registration apparatus according to a first embodiment.

FIG. 1 is a block diagram depicting a configuration example of an image-registration apparatus according to a first embodiment. As per the depiction in FIG. 1, the image-registration apparatus 100 has an image-input unit 102, a reduced-image generation unit 103, a local-characteristic-point extraction unit 104, a local-characteristic-amount computation unit 105, and a characteristic-amount registration unit 106.

With regard to the image-registration apparatus 100, the reduced-image generation unit 103 generates a reduced image of an image to be registered 101 that is inputted into the image-input unit 102, and the local-characteristic-point extraction unit 104 extracts a local characteristic point from the reduced image. The local-characteristic-amount computation unit 105 computes a local characteristic amount of the local characteristic point, and the characteristic amount registration unit 106 associates the image to be registered 101 with the local characteristic amount thus computed, and registers the image to be registered 101 and the local characteristic amount in an image characteristic database 107. The image-registration process that is executed within the image-registration apparatus 100 will be described in further detail hereinafter. The image characteristic database 107 is a storage unit that stores an image that is similar to the inputted image.

Figure 2:
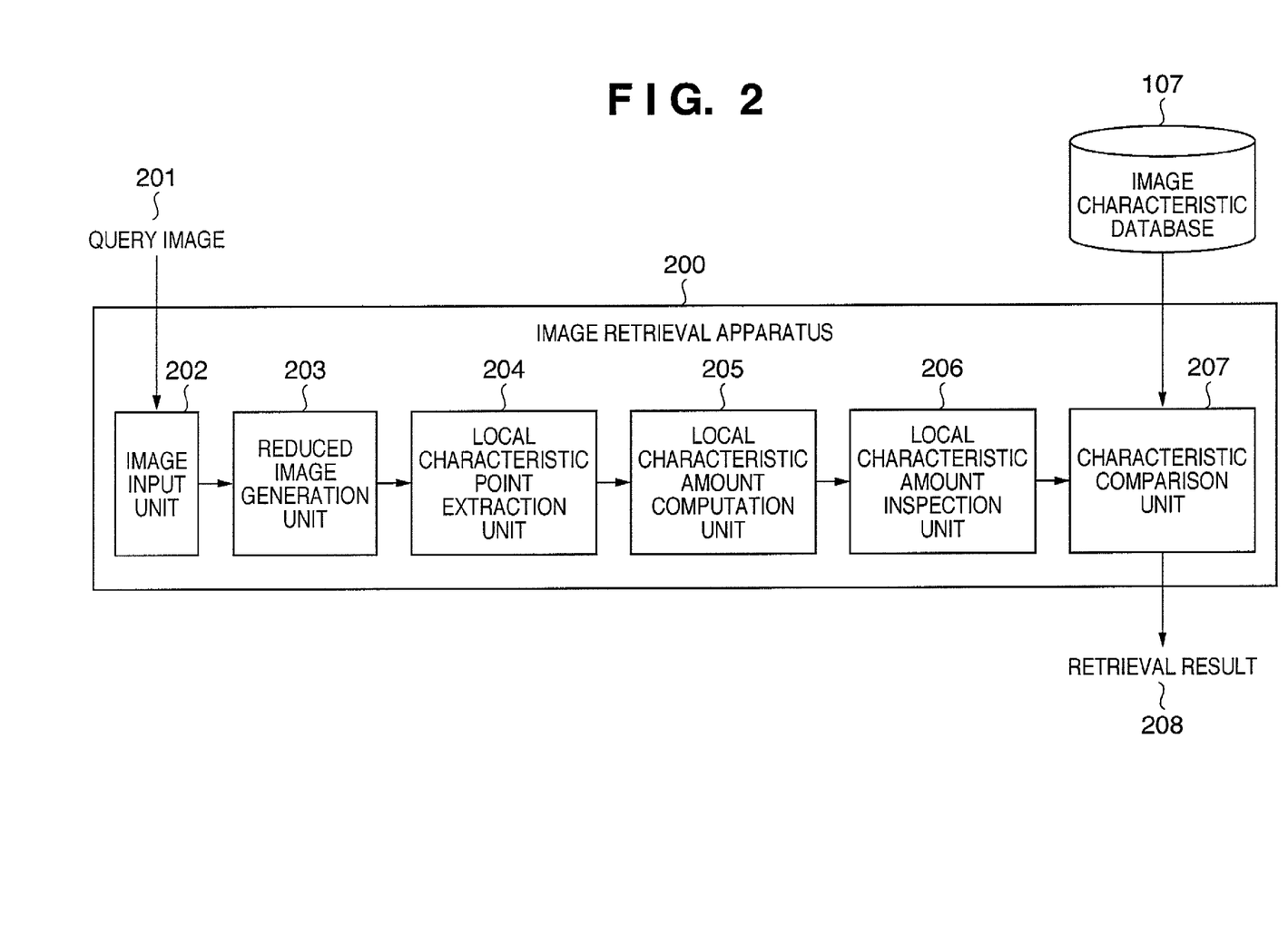
FIG. 2 is a block diagram depicting a configuration example of an image-retrieval apparatus according to the first embodiment.

FIG. 2 is a block diagram depicting a configuration example of an image-retrieval apparatus according to the first embodiment. As per the depiction in FIG. 2, an image-retrieval apparatus 200 is configured of an image-input unit 202, a reduced-image generation unit 203, a local-characteristic-point extraction unit 204, a local-characteristic-amount computation unit 205, a local-characteristic-amount inspection unit 206, and a characteristic-comparison unit 207.

With regard to the image-registration apparatus 200, the reduced-image generation unit 203 generates a reduced image of a query image 201 that is inputted into the image-input unit 202, and the local-characteristic-point extraction unit 204 extracts a local characteristic point from the reduced image. The local-characteristic-amount computation unit 205 computes a local characteristic amount of the local characteristic point, and the local-characteristic-amount inspection unit 206 inspects the local characteristic amount. A result of the inspection thereof is passed to the characteristic-comparison unit 207, whereupon the characteristic-comparison unit 207 retrieves an image from the image characteristic database 107 that is similar to the query image 201, in accordance with the retrieval result of the characteristic-comparison unit 207 and outputs the image thus retrieved as a retrieval result 208. The image retrieval process that is executed within the image-retrieval apparatus 200 will be described in further detail hereinafter.

[Image-Registration Process]

Figure 3:
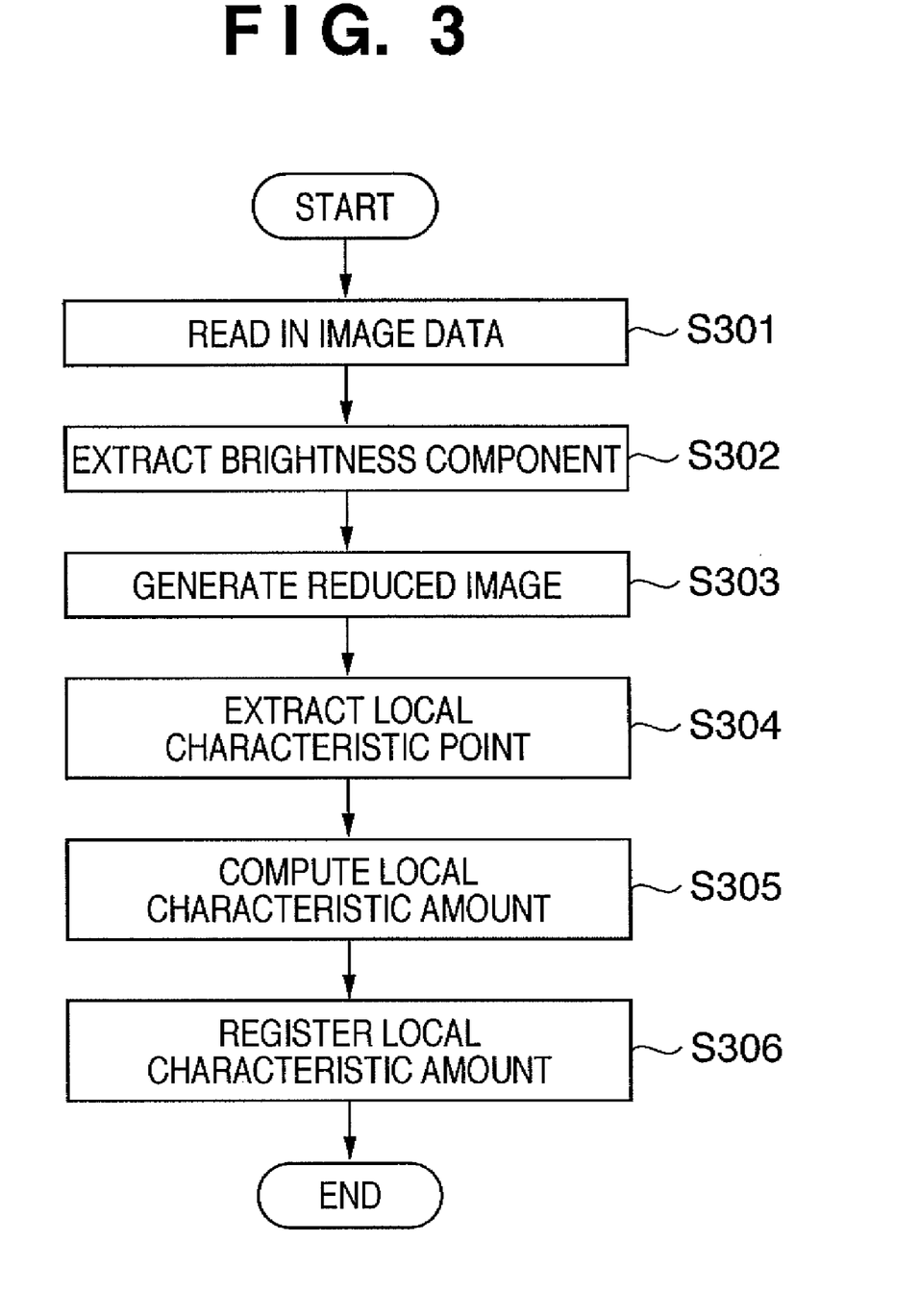
FIG. 3 is a flowchart that represents a sequence of an image-registration process.

Following is a description of each respective unit that operates when registering the image. FIG. 3 is a flowchart that represents a sequence of an image-registration process. In step S301, the image-input unit 102 that is depicted in FIG. 1 reads in the image to be registered 101, and in step S302, a brightness component is extracted from the image to be registered 101. A brightness component image is generated in accordance with the brightness component thus extracted, and the brightness component image thus generated is passed to the reduced-image generation unit 103. The image to be registered 101 is passed to the characteristic amount registration unit 106, to be described hereinafter.

In step S303, the reduced-image generation unit 103 reduces the brightness component image that is passed to the reduced-image generation unit 103 from the image-input unit 102, in stages, according to a power of magnification p, generates a number of reduced images n, and passes the reduced image to the local-characteristic-point extraction unit 104. It is presumed that both the power of magnification p and the number of reduced images n are predetermined.

Figure 4:
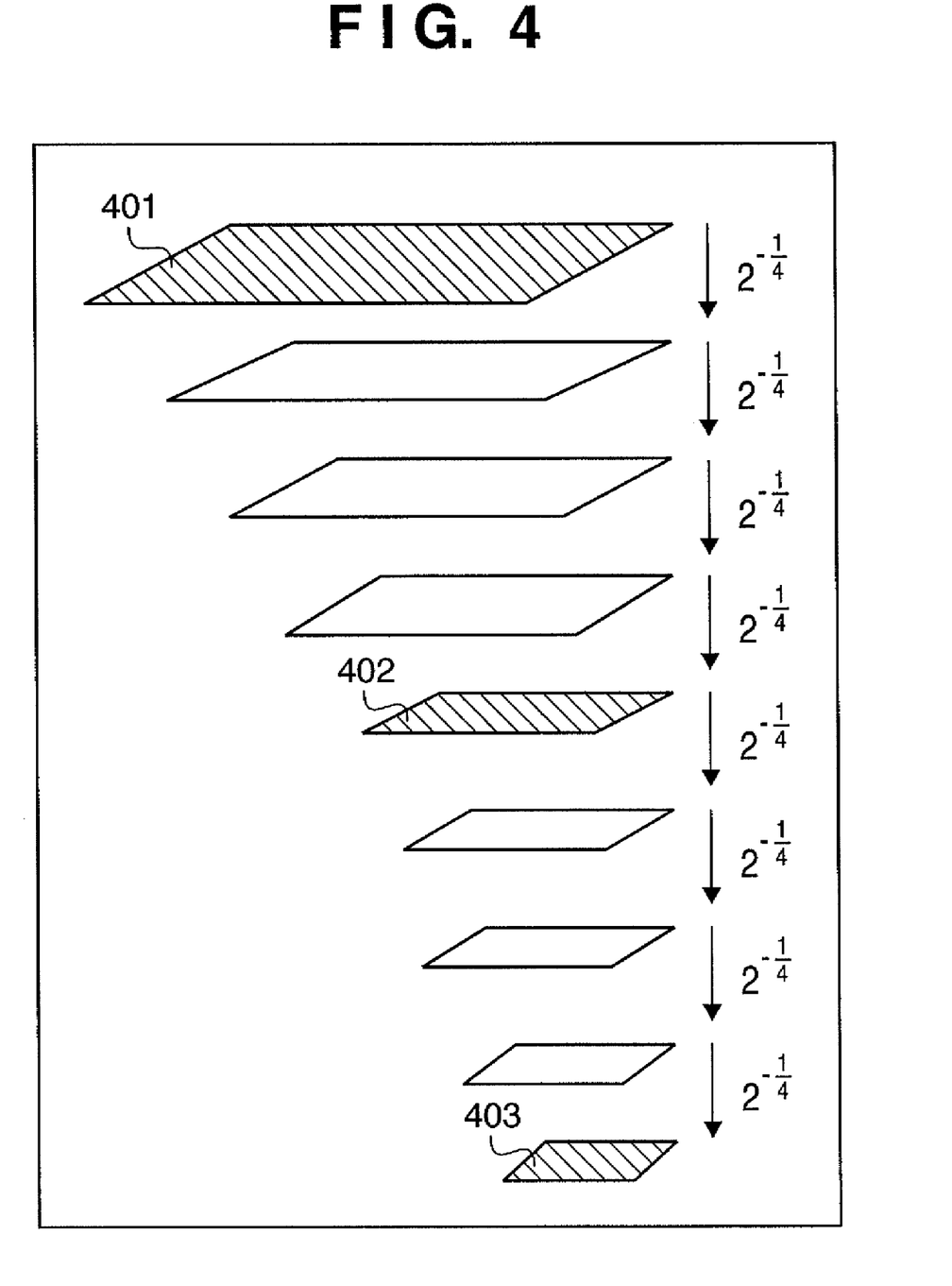
FIG. 4 depicts an example of a process of a reduced-image generation unit 103 that generates a reduced image.

FIG. 4 depicts an example of a process of the reduced-image generation unit 103 that generates the reduced image. The example that is depicted in FIG. 4 is that of a circumstance wherein the power of magnification p is 2 to the power of $-(1/4)$, and the number of reduced images n is 9. In FIG. 4, reference numeral 401 is the brightness component image that is passed from the image-input unit 102. Reference numeral 402 is a reduced image that has been reduced four times from the brightness component image, according to the power of magnification p. Reference numeral 403 is a reduced image that has been reduced eight times from the brightness component image, according to the power of magnification p.

In the present example, the reduced image 402 is an image that has been reduced to one-half of the size of the brightness component image that has been passed from the image-input unit 102, and the reduced image 403 is an image that has been reduced to one-fourth of the size of the brightness component image that has been passed from the image-input unit 102. Any method of reducing the image would be permissible, and it is presumed according to the first embodiment that the reduced images are generated by a reduction method that employs a linear interpolation.

Returning to FIG. 3, in step S304, the local-characteristic-point extraction unit 104 extracts a localized characteristic point, i.e., a local characteristic point that is extracted robustly even if each respective reduced image of the number of reduced images n that is passed from the reduced-image generation unit 103 undergoes a rotation. In the present circumstance, a robust local characteristic point is taken to mean a local characteristic point that possesses robustness, or a tolerance, such that it is extracted in a stable manner, and is not lost when an image is rotated in an image process. The local characteristic point thus extracted is passed to the local-characteristic-amount computation unit 105. A Harris Operator is employed according to the first embodiment as a method of extracting the local characteristic amount according to the first embodiment. Refer to C. Harris and M. J. Stephens, "A combined corner and edge detector," in Alvey Vision Conference, pages 147-151, 1988.

More specifically, for a pixel of an output image H that is obtained by operating the Harris Operator, a search is made of a pixel value of the pixel and of eight pixels in a vicinity of the pixel, for a total of nine pixels. A point that is a local maximum of the pixel, i.e., a point where the pixel value of the pixel is at its greatest among the nine pixels, is extracted as the local characteristic point. In the present circumstance, it is presumed that the pixel will not be extracted as the local characteristic point, even if the pixel is the local maximum, if the value of the pixel is less than or equal to a threshold value. The pixel value is a value that denotes a degree to which each respective pixel is suited for being a locality.

It would be possible to apply any characteristic-point extraction method to the local-characteristic-point extraction unit 104, rather than the Harris-Operator characteristic-point extraction method, if the method is capable of extracting the local characteristic point.

In step S305, the local-characteristic-amount computation unit 105 computes a characteristic amount, i.e., the local characteristic amount, which is defined as being invariant even by rotation for each respective image, of the local characteristic point that is passed to the local-characteristic-amount computation unit 105 from the local-characteristic-point extraction unit 104. The local characteristic amount thus extracted is associated with coordinate information and passed to the characteristic amount registration unit 106. A combination of a Local Jet and a derivative thereof is employed as a method of computing the local characteristic amount according to the first embodiment. Refer to J. J. Koenderink and A. J. van Doorn, "Representation of local geometry in the visual system," Biological Cybernetics, vol. 55, pp. 367-375, 1987.

More specifically, the local characteristic amount is computed by way of equation (1), following:

$$v = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \quad (1)$$

Note that a notation that is employed at a right hand side of the equation (1) is defined by the equations (2) through (7), which are depicted hereinafter. In the present circumstance, a "G(x, y)" at a right hand side of the equation (2) is a Gaussian function, an "I(x, y)" at the right hand side of the equation (2) is a pixel value with regard to a coordinate (x, y) of the image, and "*" is a notation that signifies a convolution. The equation (3) is a partial derivative that relates to a variable L sub x that is defined in the equation (2), and the equation (4) is a partial derivative of the variable L sub y thereof. The equation (5) is a partial derivative that relates to a variable Lx sub y that is defined in the equation (3), the equation (6) is a partial derivative that relates to a variable Lx sub x that is defined in the equation (3), and the equation (7) is a partial derivative that relates to a variable Ly sub y that is defined in the equation (4).

$$L = G(x, y) * I(x, y) \quad (2)$$

$$L_x = \frac{\partial L}{\partial x} \quad (3)$$

$$L_y = \frac{\partial L}{\partial y} \quad (4)$$

$$L_{xy} = \frac{\partial^2 L}{\partial x \partial y} \quad (5)$$

$$L_{xx} = \frac{\partial^2 L}{\partial x^2} \quad (6)$$

$$L_{yy} = \frac{\partial^2 L}{\partial y^2} \quad (7)$$

It would be possible to apply any characteristic amount computation method, rather than the characteristic amount computation method such as the foregoing method, if the method is capable of computing the local characteristic amount.

In step S306, the characteristic amount registration unit 106 associates the local characteristic amount that is passed to the characteristic-amount registration unit 106 from the local-characteristic-amount computation unit 105 with the image to be registered 101, and registers the data in the image characteristic database 107. The image-registration process terminates thereupon.

[Image Retrieval Process]

Figure 5:
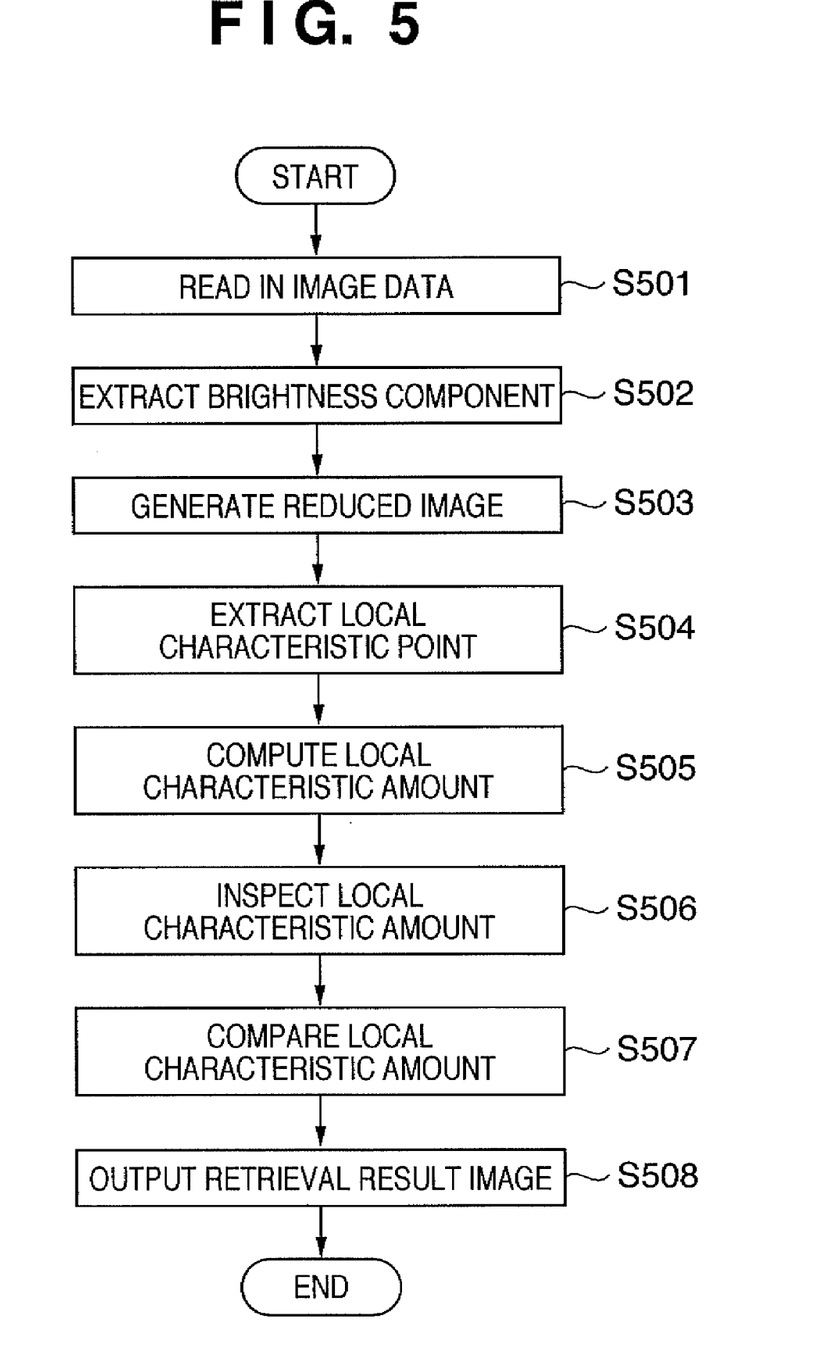
FIG. 5 is a flowchart that represents a sequence of an image retrieval process.

Following is a description of each respective unit that operates when retrieving the image FIG. 5 is a flowchart that represents a sequence of an image retrieval process. In step S501, the image-input unit 202 that is depicted in FIG. 2 reads in the query image 201, and in step S502, a brightness component is extracted from the query image 201. A brightness component image is generated in accordance with the brightness component thus extracted, and the brightness component image thus generated is passed to the reduced-image generation unit 203.

In step S503, the reduced-image generation unit 203 reduces the brightness component image that is passed to the reduced-image generation unit 203 from the image-input unit 202, in stages, according to a power of magnification p, generates a number of reduced images n, and passes the reduced image to the local-characteristic-point extraction unit 204. It is presumed that both the power of magnification p and the number of reduced images n are the same values as the values that are employed in the image-registration process.

In step S504, the local-characteristic-point extraction unit 204 extracts a localized characteristic point, i.e., a local characteristic point, that is extracted robustly even if each respective reduced image of the number of reduced images n that is passed from the reduced-image generation unit 203 undergoes a rotation. The local characteristic point thus extracted is passed to the local-characteristic-amount computation unit 205. The Harris Operator is employed as the method of extracting the local characteristic amount, similar to the method that is employed in the image-registration process.

More specifically, for a pixel of an output image H that is obtained by operating the Harris Operator, a search is made of a pixel value of the pixel and of eight pixels in a vicinity of the pixel, for a total of nine pixels. A point that is a local maximum of the pixel, i.e., a point where the pixel value of the pixel is at its greatest among the nine pixels, is extracted as the local characteristic point. In the present circumstance, it is presumed that the pixel will not be extracted as the local characteristic point, even if the pixel is the local maximum, if the value of the pixel is less than or equal to a threshold value.

It would be possible to apply any characteristic point extraction method to the local-characteristic-point extraction unit 204, rather than the Harris Operator characteristic point extraction method, if the method is capable of extracting the local characteristic point.

In step S505, the local-characteristic-amount computation unit 205 computes a characteristic amount, i.e., the local characteristic amount, which is defined as being invariant even by rotation for each respective image, of the local characteristic point that is passed to the local-characteristic-amount computation unit 205 from the local-characteristic-point extraction unit 204. The local characteristic amount thus extracted is associated with coordinate information and passed to the characteristic-amount inspection unit 206. The method of computing the local characteristic amount that is used herein is the same method that is employed in the image-registration process. Put another way, a combination of a Local Jet and a derivative thereof is employed, and the equation (1) is used to perform the computation of the local characteristic amount.

In step S506, the local-characteristic-amount inspection unit 206 inspects each respective fluctuation of the local characteristic amount that is passed to the local-characteristic-amount inspection unit 206 from the local-characteristic-amount computation unit 205. In order to simplify the description hereinafter, in the present circumstance, the local characteristic amount that is passed from the local-characteristic-amount computation unit 205 will be described as the local characteristic amount (zero degrees).

The inspection according to the first embodiment carries out a 45 degree rotation inspection. Put another way, a Gaussian filter that is used by the local-characteristic-amount computation unit 105 and 205 in the computation of the local characteristic amount is preset to a filter that is rotated 45 degrees, i.e., a 45 degree rotation filter, and the 45 degree rotation filter is used to carry out the inspection. In the present circumstance, to rotate the filter 45 degrees refers to conducting a geometric rotation transformation on a predetermined filter coefficient.

Figure 7:
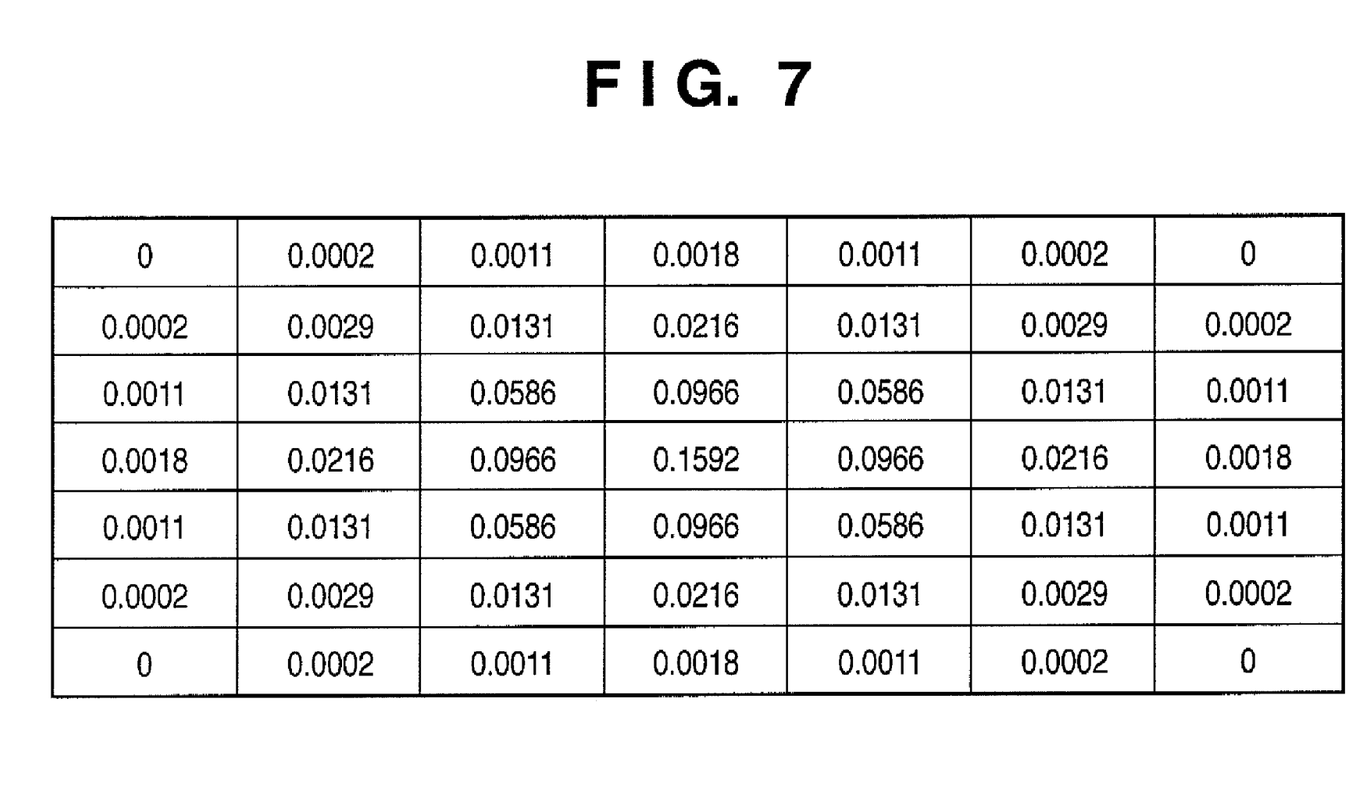
FIG. 7 depicts an example of a Gaussian filter.
Figure 8:
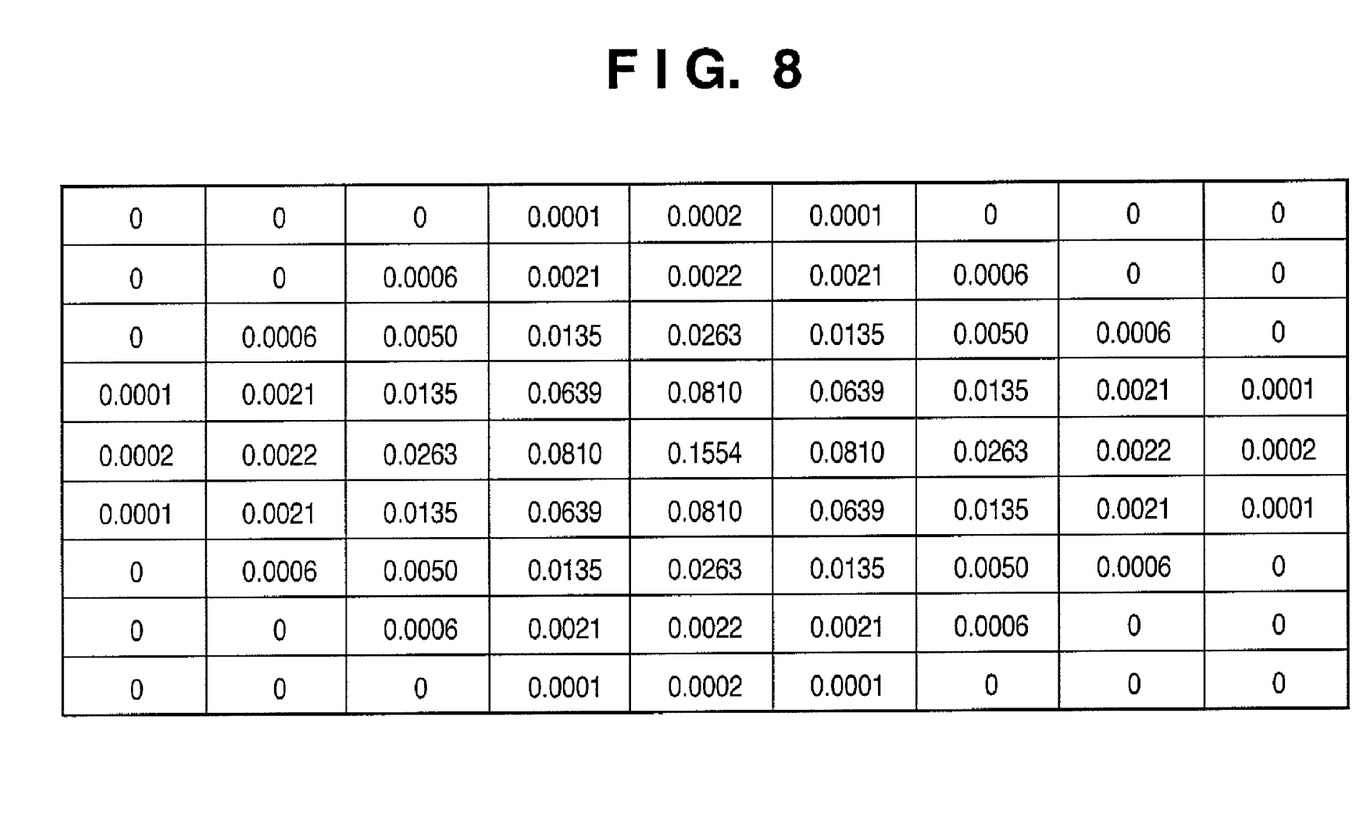
FIG. 8 depicts an example of a Gaussian filter wherein the filter that is depicted in FIG. 7 has been rotated by 45 degrees.

FIG. 7 depicts an example of a Gaussian filter. FIG. 8 depicts an example of a Gaussian filter wherein the filter that is depicted in FIG. 7 has been rotated by 45 degrees. It is the Gaussian filter that is rotated, not the query image 201. Rotating the Gaussian filter instead of the query image 201 results in a lower processing load, allowing a rapid execution of a subsequent inspection process.

Following is a detailed description of the inspection process according to the first embodiment. The 45-degree rotation filter that is depicted in FIG. 8 is used to compute the local characteristic amount (45 degrees), by way of the same method whereby the local-characteristic-amount computation unit 205 computed the local characteristic amount in step S505. Lastly, a comparison is made of a Mahalanobis distance between the local characteristic amount (zero degrees) and the local characteristic amount (45 degrees), and if the Mahalanobis distance is less than or equal to a determined threshold value, the inspection is considered to be passed, whereas a different result thereof is considered to have failed the inspection. Put another way, only the local characteristic amount that passes the inspection is passed to the characteristic-comparison unit 207. A variance-covariance matrix that is used for calculating the Mahalanobis distance is pre-derived from a number of the local characteristic amount.

Thus, using the rotated filter to pre-inspect an extent of the fluctuation of the local characteristic amount allows performing a query using only the local characteristic amount with a small fluctuation, with a potential for retrieval with a high degree of precision, according to the first embodiment.

Whereas the description according to the first embodiment is of a circumstance wherein the number of degrees whereby the filter is rotated at time of inspection being 45 degrees, and only a 45 degree inspection is carried out, it would be permissible for the rotation inspection to be carried out at a unit of t degrees, ranging, for example, from zero to 90 degrees, rather than only at 45 degrees, provided that t is a predetermined value that satisfies an inequality 0<t<90.

It would also be permissible to promote a reduction in a characteristic point to be inspected by performing a series of rotation inspections, in stages, by rotating the filter by a number of degrees that is obtained by repeating a division of 20% intervals from 90 degrees to less than or equal to t degrees, rather than carrying out the rotation inspection at intervals of every t degrees.

Returning to FIG. 5, in step S507, the characteristic-comparison unit 207 compares the local characteristic amount that is passed to the characteristic-comparison unit 207 from the local-characteristic-amount inspection unit 206 with the local characteristic amount that is registered with the image characteristic database 107. The comparison is carried out for each and every registered image that is registered with the image characteristic database 107, and a degree of similarity is computed for each and every registered image as a result of the comparison thereof. Further details of a method of computing the degree of similarity thereof will be described hereinafter.

In step S508, the characteristic-comparison unit 207 associates the degree of similarity thus computed with an image that is a source of the computation of the degree of similarity thereof and generates a retrieval result list, whereupon the characteristic-comparison unit 207 sorts the degree of similarity in descending order. Thereafter, an image with a high degree of similarity and the degree of similarity of the image is outputted as a retrieval result 208.

[Method of Computing Degree of Similarity]

Figure 6:
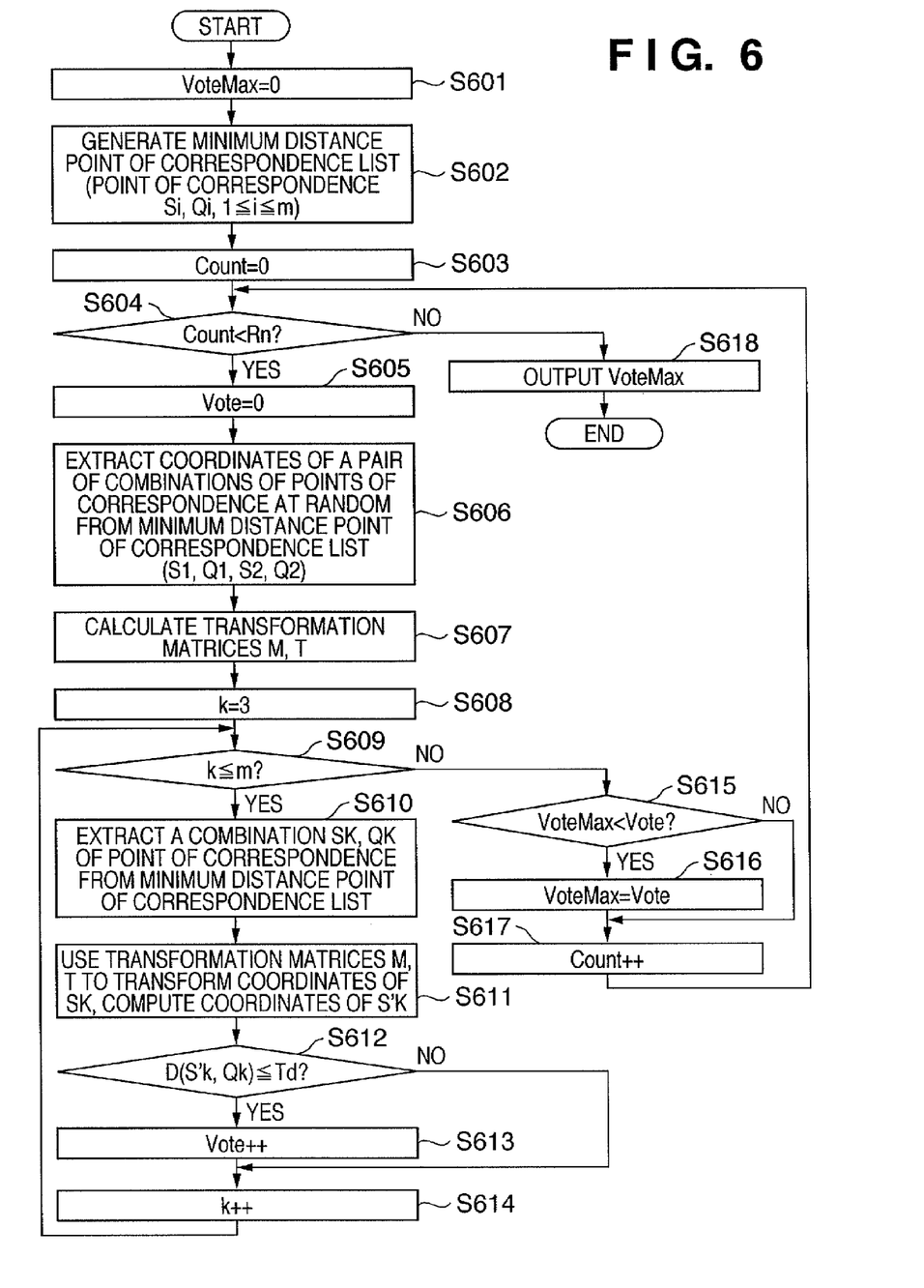
FIG. 6 is a flowchart that depicts a sequence of a computation of a degree of similarity according to the first embodiment.

Following is a description of a method of computing the degree of similarity. In the present circumstance, it is presumed that the local characteristic amount that is passed from the local-characteristic-amount inspection unit 206 is Vq, the local characteristic point that is associated with the local characteristic amount is Q, and a coordinate that is associated with the local characteristic amount is Q(x', y'). It is also presumed the local characteristic amount that is present in an image R that is registered with the image characteristic database 107 is Vs, the local characteristic point that is associated with the local characteristic amount is S, and a coordinate that is associated with the local characteristic amount is S(x, y).

FIG. 6 is a flowchart that depicts a sequence of the computation of the degree of similarity according to the first embodiment. The computation of the degree of similarity is performed by a voting process, i.e., a polling process. A number of votes equals the degree of similarity. In step S601, a variable VoteMax, which represents a maximum number of votes, is initialized to zero. The maximum number of votes is a maximum number of votes that are obtained when performing a plurality of votes. In step S602, a calculation is made of all combinations of a distance between the characteristic amount of Vq and Vs, and a minimum distance point of correspondence list is generated. Put another way, a combination, i.e., a point of correspondence, of Vq and Vs, is extracted, and registered with the minimum distance point of correspondence list, wherein the distance between the characteristic amount that is thus calculated is less than or equal to a threshold value Tv, and is also a minimum distance between the characteristic amount that is thus calculated.

Hereinafter, with regard to a point of correspondence k that is registered with the minimum distance point of correspondence list, the local characteristic amount of the point of correspondence k will be respectively denoted as Vq(k) and Vs(k). The local characteristic point that is associated with the Vq(k) and the Vs(k) will respectively be denoted as Qk and Sk, and the coordinate that is associated with the Vq(k) and the Vs(k) will respectively be denoted, together with an index, such as Qk(x'k, y'k) and Sk(xk, yk). A number of combinations of the point of correspondence that is registered with the minimum distance point of correspondence list that is generated in step S602 will be referred to as m combinations.

In step S603, a variable Count, which represents an iteration count number of the degree of similarly computation process, is initialized to zero. In step S604, a determination is made that the iteration count number Count does not exceed a predetermined maximum number of process count iterations Rn. In the present circumstance, if the iteration count number Count does exceed the predetermined maximum number of process count iterations Rn, the process proceeds to step S618, the maximum number of votes VoteMax is outputted, and the process terminates.

If, on the other hand, the iteration count number Count does not exceed the predetermined maximum number of process count iterations Rn in step S604, the process proceeds to step S605, wherein a variable Vote, which represents a number of votes, is initialized to zero. In step S606, coordinates of a pair of points of correspondence are extracted at random from the minimum distance point of correspondence list. In the present circumstance, the coordinates will be denoted as Q1 (x'1, y'1), S1 (x1, y1), and Q2 (x'2, y'2), and S2 (x2, y2). In step S607, a presumption is made that the coordinates Q1 (x'1, y'1), S1 (x1, y1), and Q2 (x'2, y'2), and S2 (x2, y2), which were extracted in step S606, satisfy a conversion that is depicted in the equation (8), and a variable a-f in the equation (8) are derived.

Note that in step S607, as depicted in FIG. 6, a matrix that is configured of the variables a-d is denoted as "M", and a matrix that is configured of the variables e-f is denoted as "T".

$$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix} \quad (8)$$

In the present circumstance, for purposes of simplification, only a similarity transformation will be considered according to the first embodiment. In such a circumstance, it would be possible to rewrite the equation (8) as the equation (9), following:

$$\begin{pmatrix} x'_k \\ y'_k \end{pmatrix} = \begin{pmatrix} a & -b \\ b & a \end{pmatrix} \begin{pmatrix} x_k \\ y_k \end{pmatrix} + \begin{pmatrix} e \\ f \end{pmatrix} \quad (9)$$

In such a circumstance, the notation x'1, y'1, x1, y1, x'2, y'2, x2, and y2 is used to represent the variables a, b, e, and f, in the equation (10) through the equation (13), following:

$$a = \frac{(x_1 - x_2)(x'_1 - x'_2) + (y_1 - y_2)(y'_1 - y'_2)}{(x_1 - x_2)^2 + (y_1 - y_2)^2} \quad (10)$$

$$b = \frac{(x_1 - x_2)(y'_1 - y'_2) + (y_1 - y_2)(x'_1 - x'_2)}{(x_1 - x_2)^2 + (y_1 - y_2)^2} \quad (11)$$

$$e = \frac{(y'_1 - y'_2)(x_1 y_2 - x_2 y_1) -}{(x'_1 + x'_2)(x_1 x_2 + y_1 y_2) + x'_1(x_2^2 + y_2^2) + x'_2(x_1^2 + y_1^2)} \quad (12)$$

$$f = \frac{(x'_1 - x'_2)(y_1 x_2 - y_2 x_1) -}{(y'_1 + y'_2)(y_1 y_2 + x_1 x_2) + y'_1(y_2^2 + x_2^2) + y'_2(y_1^2 + x_1^2)} \quad (13)$$

In step S608, a point of correspondence selection variable k is initialized to 3, in order to select a point from the minimum distance point of correspondence list other than the coordinates of the pairs of points of correspondence that are extracted at random in step S606 from the minimum distance point of correspondence list. In step S609, a determination is made as to whether or not the point of correspondence selection variable k exceeds the number of combinations m of the points of correspondence that are registered with the minimum distance point of correspondence list. In the present circumstance, if the point of correspondence selection variable k exceeds the number of combinations m of the points of correspondence that are registered with the minimum distance point of correspondence list, the process proceeds to step S615 (to be described hereinafter). If, on the other hand, it is determined in step S609 that the point of correspondence selection variable k does not exceed the number of combinations m of the points of correspondence that are registered with the minimum distance point of correspondence list, the process proceeds to step S610.

In step S610, a point other than the pairs of points of correspondence S1 (x1, y1) and S2 (x2, y2) that are extracted at random in step S606 from the minimum distance point of correspondence list is extracted. The point thus extracted will be denoted as Sk(xk, yk) according to the first embodiment.

In step S611, the equation (9) is used to derive a coordinate Sk'(x'k, y'k) whereat the point Sk(xk, yk) is transitioned.

In step S612, a geometric distance between the coordinate Sk'(x'k, y'k) and the coordinate Qk'(x'k, y'k) is calculated with a Euclidean distance, and a determination is made as to whether or not the Euclidean distance is less than or equal to a threshold value Td. If the Euclidean distance is less than or equal to a threshold value Td, the process proceeds to step S613, wherein the number of votes Vote is incremented, and the process proceeds to step S614. If, on the other hand, the Euclidean distance is greater than the threshold value Td, the process proceeds directly to step 614 instead. A characteristic point wherein the Euclidean distance is less than or equal to the threshold value Td is a characteristic point that is treated as being similar among the images.

In step S614, the point of correspondence selection variable k is incremented, and the process returns to step S609, whereupon the process repeats until the point of correspondence selection variable k exceeds the number of combinations m of the points of correspondence that are registered with the minimum distance point of correspondence list. Put another way, the vote is repeated, with a different pair of points being extracted anew in step S606, the parameter variables a, b, e, and f being derived in the equation (9) in step S607, and the process from step S608 to step S612 being performed.

Following is a description of step S615, wherein the process is performed in the circumstance wherein the point of correspondence selection variable k exceeds the number of combinations m of the points of correspondence that are registered with the minimum distance point of correspondence list, in step S609. In step S615, a comparison is made between the value of the number of votes "Vote" and the value of the maximum number of votes "VoteMax", and if the value of the number of votes "Vote" is greater than the value of the maximum number of votes "VoteMax", the process proceeds to step S616.

In step S616, the value of the maximum number of votes "VoteMax" is replaced with the value of the number of votes "Vote", and in step S617, the iteration count number Count is incremented, whereupon the process returns to step S604.

If, on the other hand, the value of the number of votes "Vote" is less than or equal to the value of the maximum number of votes "VoteMax" in step S615, the process proceeds to step S617, wherein the iteration count number "Count" is incremented, and the process returns to step S604.

Whereas the description of the method of computing the degree of similarity according to the first embodiment considers only the similarity transformation, it would be possible to respond to another geometric transformation, such as an affine transformation, by deriving a transformation matrix in step S607 that corresponds to each respective transformation. For example, presume that with regard to the affine transformation, the number of coordinates of the combination of the point of correspondence to be randomly selected in step S606 is three. In step S607, it is presumed that it would be permissible to use the equation (8), rather than the equation (9), and to use the three points of correspondence that were selected in step S606 to derive the variables a-f.

Whereas the description of the method of computing the degree of similarity according to the first embodiment described the method that outputs the maximum number of votes "VoteMax" as the degree of similarity in step S618, the present invention is not restricted thereto, and it would be permissible to calculate a different degree of similarity. Put another way, the number of combinations m of the points of correspondence that are registered with the minimum distance point of correspondence list that is generated in step S602 is outputted as the degree of similarity. As a result, it becomes possible to improve a speed of retrieval while maintaining a given degree of precision in the retrieval.

It will be understood from the preceding section that the image-retrieval apparatus according to the first embodiment is configured so as to inspect the fluctuation of the local characteristic amount that is calculated from the query image, and not to use the local characteristic amount that possesses the large fluctuation, thus allowing keeping a deterioration in the precision of the retrieval under control.

[Variant Example of First Embodiment]

Whereas the local-characteristic-amount inspection unit 206 used the rotated filter to inspect the local characteristic amount, it would be permissible to compute the local characteristic amount after rotating the image itself, rather than rotating the filter, and to perform the inspection by using the local characteristic amount thus computed.

As per the first embodiment, the variant embodiment example is configured so as to inspect the fluctuation of the local characteristic amount that is calculated from the query image 201 and not to use the local characteristic amount with the large fluctuation, thus allowing keeping the deterioration in the precision of the retrieval under control.

[Second Embodiment]

Following is a detailed description of a second embodiment according to the present invention, with reference to the attached drawings. According to the second embodiment, the inspection of the local characteristic amount is performed even during the process of registering the image.

Figure 9:
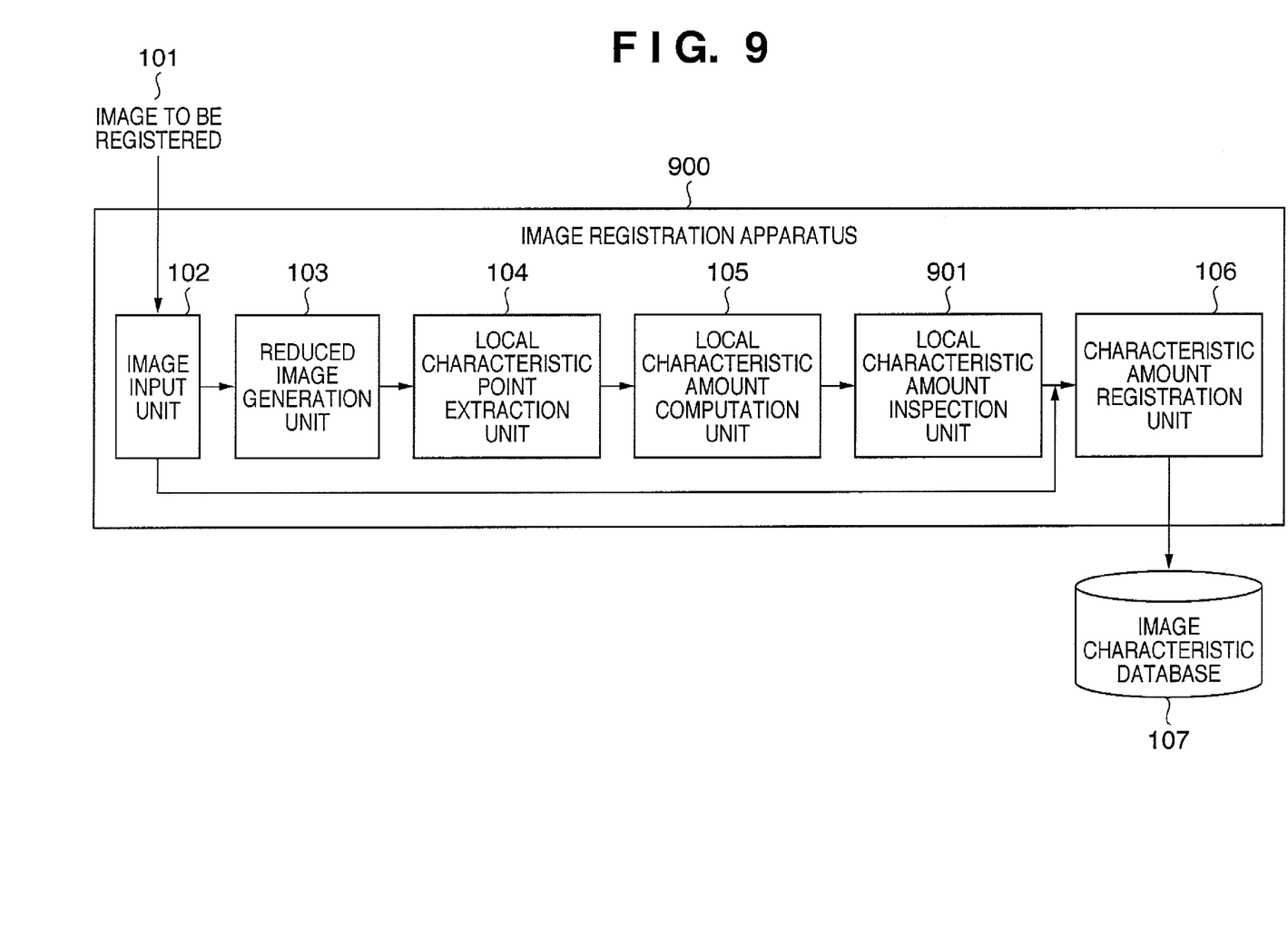
FIG. 9 is a block diagram depicting a configuration example of an image-registration apparatus according to a second embodiment.

FIG. 9 is a block diagram depicting a configuration example of an image-registration apparatus according to the second embodiment. As per the depiction in FIG. 9, a local-characteristic-amount inspection unit 901 is added in between the local-characteristic-amount computation unit 105 and the characteristic amount registration unit 106 of the image-registration apparatus 100 that is described according to the first embodiment.

The local-characteristic-amount inspection unit 901 performs a process that is similar to the process that is performed by the local-characteristic-amount inspection unit 206 according to the first embodiment. Put another way, a filter is prepared that is rotated 45 degrees, i.e., a 45-degree rotation filter, from the filter that is used in the local-characteristic-amount computation unit 105 to compute the local characteristic amount, and the 45 degree rotation filter is used to perform the inspection.

Following is a description of a specific inspection method according to the second embodiment. Using the 45-degree rotation filter, the local characteristic amount (45 degrees) is computed by a method that is similar to the method that is used by the local-characteristic-amount computation unit 105 in step S305. Lastly, a comparison is made of the Mahalanobis distance between the local characteristic amount (zero degrees) and the local characteristic amount (45 degrees). If the Mahalanobis distance is less than or equal to a predetermined threshold value, the inspection is considered to be passed, whereas a different result thereof is considered to have failed the inspection. Put another way, only the local characteristic amount that passes the inspection is passed to the characteristic amount registration unit 106.

The number of degrees of rotation of the filter is not limited to 45 degrees, and it would be permissible for the rotation inspection to be carried out at a unit of t degrees, ranging, for example, from zero to 90 degrees, rather than only at 45 degrees, provided that t is a predetermined value that satisfies an inequality 0<t<90.

It would also be permissible to promote a reduction in a characteristic point to be inspected by performing a series of rotation inspections, in stages, by rotating the filter by a number of degrees that is obtained by repeating a division of 20% intervals from 90 degrees to less than or equal to t degrees, rather than carrying out the rotation inspection at intervals of every t degrees.

It would also be permissible to carry out the rotation inspection by rotating the image itself, rather than by rotating the filter.

According to the second embodiment, the image-processing apparatus is configured so as to inspect the fluctuation of the local characteristic amount that is calculated from the registration image at the time that the image-registration process is performed, and not to register the local characteristic amount that possesses the large fluctuation, thus allowing keeping a deterioration in the precision of the retrieval under control.

[Variant Embodiment Example]

Whereas a common threshold value is used with regard to the entire local characteristic amount in the process of inspecting the local characteristic amount to determine whether the inspection process succeeds or fails according to the first and the second embodiment, it would be permissible to change an inspection criterion on a per image basis. Put another way, if a number of the local characteristic amount that succeeds in the inspection is less than or equal to a given number, a predetermined value r is used, a new threshold value with a value of r times the present threshold value, and the inspection is performed again, with the process being repeated until the number of characteristic points that succeed in the inspection is greater than or equal to the given number.

By thus changing the inspection criterion on the per image basis, it is possible to perform the inspection by, for example, deriving the local characteristic amount even for an image that possesses only the local characteristic amount with the large fluctuation with regard to the rotation thereof. If, on the other hand, the inspection criterion is set to a prescribed threshold, it is not possible to derive the local characteristic amount from such an image that possesses only the local characteristic amount with the large fluctuation with regard to the rotation thereof, and thus, the image cannot be inspected.

A method has been described herein for a pixel of an output image H that is obtained by operating the Harris Operator, a search is made of a pixel value of the pixel and of eight pixels in a vicinity of the pixel, for a total of nine pixels, and a point that is a local maximum of the pixel, i.e., a point where the pixel value of the pixel is at its greatest among the nine pixels, is extracted as the local characteristic point. Thereafter, the pixel will not be extracted as the local characteristic point, even if the pixel is the local maximum, if the value of the pixel is less than or equal to a threshold value.

The present invention is not restricted thereto, however, and it would be permissible to extract as the characteristic point even the pixel wherein the value of the pixel is less than or equal to the threshold value, compute the local characteristic amount from all of the characteristic points that are thus extracted, and carry out the inspection process on the local characteristic amount.

Put another way, when the pixel of the output image H that is obtained by operating the Harris Operator is the local maximum, the pixel is extracted as even when the value of the pixel is less than or equal to the threshold value, the local characteristic amount is computed from all of the characteristic points that are thus extracted, and the inspection process is carried out on the local characteristic amount. Thus, the local characteristic amount of even a point that has not thus far been extracted as the characteristic point will be used at the time of inspection, if the local characteristic amount that is computed from the characteristic point succeeds in the inspection.

On the other hand, the point that is being extracted thus far as the characteristic point is not affected by the preceding method. Put another way, the local characteristic amount increases, and it thus becomes possible to further improve the precision of the retrieval.

Whereas a method has been described for the process of inspecting the local characteristic amount, wherein only the local characteristic amount that succeeds in the inspection is used, and the local characteristic amount that fails the inspection is discarded, it would be permissible not to discard the local characteristic amount that fails the inspection, and change a weighting for the local characteristic amount in response to the inspection result. In such a circumstance, the weighting is used when computing the degree of similarity.

For example, a weighting W of the local characteristic amount would be determined such as per the equation (14), following:

$$W=1/(1+D) \quad (14)$$

Where D is the Mahalanobis distance between the local characteristic amount and the local characteristic amount when the filter is rotated 45 degrees at the time of inspection.

Whereas the computation of the degree of similarity involves performing the calculation of the degree of similarity in step S613 according to the first embodiment, it would be permissible to calculate the degree of similarity taking into consideration only a weighting such as per the equation (15), following:

$$\text{Vote}=\text{Vote}+W \quad (15)$$

Whereas the weighting computation method is defined such as per the equation (14), it would be possible to substitute another weighting method, if the method increases the weighting of the local characteristic amount that has a small fluctuation, and reduces the weighting of the local characteristic amount that has the large fluctuation.

Put another way, the degree of similarity is calculated by performing the weighting on the per local characteristic amount basis, without excluding the local characteristic amount, thus allowing the inspection even with regard to an image that possesses only the local characteristic amount that has the large fluctuation with regard to the rotation, for example.

Whereas the inspection is carried out with regard to the rotation according to the embodiments, the present invention is not restricted thereto, and it would be permissible to inspect the fluctuation in the local characteristic amount even with regard to another image process, such as enlarging or reducing the image, and not using the local characteristic amount that possesses the large fluctuation at the time of inspection. It would thus be possible to keep the deterioration in the precision of the inspection under control even in a circumstance wherein an image other than a rotated image is targeted for the inspection.

It would be permissible to apply the present invention to a system that is configured from a plurality of devices, such as, for example, a host computer, an interface device, a reader, and a printer, as well as to apply the present invention to a system that is configured from a single apparatus, such as, for example, a copier or a fax machine.

It is to be understood that the objective of the present invention is achieved by a recording medium whereupon is recorded a software program code that implements the function according to the embodiment being supplied to the system or the apparatus, and a computer, i.e., a CPU or an MPU, of the system or the apparatus loading and executing the program code that is stored upon the recording medium.

In such a circumstance, the program code itself that is loaded from a computer-readable recording medium implements the function according to the embodiment, and the recording medium that stores the program code configures the present invention.

As the recording method for supplying the program code, it would be possible to employ such as a floppy disk, a hard disk drive, an optical disc, a magneto-optical disk, a CD-ROM, a CD-R, a magnetic tape, a nonvolatile memory card, or a ROM, for example.

It is to be understood that the following circumstance is also included, in addition to implementing the function according to the embodiment by the computer executing the program code thus loaded: a circumstance wherein an operating system or other software that is running on the computer performs an actual process, whether in whole or in part, in accordance with an instruction of the program code, and the function according to the embodiment is implemented by the process thus performed.

It is to be understood that the following circumstance is also included: the program code that is loaded from the recording medium is written to a memory that is incorporated into an expansion board that is installed within the computer or an expansion unit that is connected to the computer. Thereafter, the CPU or other hardware that is incorporated into the expansion board or the expansion unit performs an actual process, either in whole or in part, in accordance with the direction of the program code, and the function according to the embodiment is implemented by the process thus performed.

A further embodiment of the present invention provides an image processing apparatus, comprising: a retrieval unit configured to retrieve an image that is similar to an inputted input image, from among stored images stored in a storage unit; an extraction unit configured to extract a plurality of characteristic points from the input image; a characteristic amount computation unit configured to compute a characteristic amount with regard to the characteristic point; and an evaluation unit configured to evaluate a fluctuation in the characteristic amount with regard to the characteristic point, when a prescribed alteration is made to the input image; wherein the retrieval unit selects a characteristic point, from among the plurality of characteristic points, in accordance with an evaluation performed by the evaluation unit, and retrieves a stored image that is similar to the input image, in accordance with a characteristic amount of the selected characteristic point.

A further embodiment of the present invention provides an image processing method, comprising the steps of: retrieving an image that is similar to an inputted input image, from among stored images stored in a storage unit; extracting a plurality of characteristic points from the input image; computing a characteristic amount with regard to the characteristic point; and evaluating a fluctuation in the characteristic amount with regard to the characteristic point, when a prescribed alteration is made to the input image; wherein a characteristic point is selected in the retrieval step, from among the plurality of characteristic points, in accordance with an evaluation that is performed in the evaluation step, and a stored image is retrieved that is similar to the input image, in accordance with a characteristic amount of the selected characteristic point.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-098683, filed Apr. 4, 2007, which is hereby incorporated by reference herein in its entirety.

What is claimed is:

1. An image-processing apparatus, comprising:
    an extraction unit configured to extract a plurality of characteristic points from a group of images including reduced images of an input query image;
    a characteristic-amount computation unit configured to respectively compute fluctuated characteristic amounts for the plurality of characteristic points from the group of images after a prescribed alteration is performed to the group of images;
    an evaluation unit configured to evaluate a fluctuated characteristic amount among the fluctuated characteristic amounts for the plurality of characteristic points in the group of images computed by the characteristic-amount computation unit;
    a selection unit configured to select at least one characteristic point according to a fluctuated characteristic amount that is evaluated by the evaluation unit to be less than or equal to a threshold value from the plurality of characteristic points in the group of images to use for image retrieval; and
    a retrieval unit configured to retrieve an image from among a plurality of stored images using at least one characteristic point in the group of images selected by the selection unit,
    wherein each fluctuated characteristic amount is an amount of fluctuation of a characteristic amount of the corresponding characteristic point after the prescribed alteration is performed to the respective image, and
    wherein for each characteristic point, a first characteristic amount is calculated for the characteristic point, the prescribed alteration is performed to the respective image, a second characteristic amount is calculated for the characteristic point in the image after the prescribed alteration is performed, and the fluctuated characteristic amount for the characteristic point is computed based on the first characteristic amount and the second characteristic amount.

2. The image-processing apparatus according to claim 1, wherein the characteristic-amount computation unit is configured to compute the fluctuated characteristic amounts on a per characteristic point basis, and the retrieval unit is configured to compute a degree of similarity between an evaluation image and a stored image using a selected characteristic point that has an evaluated fluctuated characteristic amount that is less than or equal to a threshold value.

3. The image-processing apparatus according to claim 1, wherein the prescribed alteration is a process that rotates the input image.

4. The image-processing apparatus according to claim 1, wherein the retrieval unit is configured to output the stored image as a retrieval result, according to the degree of similarity.

5. The image-processing apparatus according to claim 1, wherein the group of images includes the input query image.

6. An image-processing method, comprising:
    extracting a plurality of characteristic points from a group of images including reduced images of an input query image;
    respectively computing fluctuated characteristic amounts for the plurality of characteristic points from the group of images after a prescribed alteration is performed to the group of images;
    evaluating a fluctuated characteristic amount among the fluctuated characteristic amounts for the plurality of characteristic points in the group of images;
    selecting at least one characteristic point according to a fluctuated characteristic amount that is evaluated in the evaluating step to be less than or equal to a threshold value from the plurality of characteristic points in the group of images to use for image retrieval; and
    retrieving an image from among a plurality of stored images using the selected at least one characteristic point in the group of images,
    wherein each fluctuated characteristic amount is an amount of fluctuation of a characteristic amount of the corresponding characteristic point after the prescribed alteration is performed to the respective image, and
    wherein for each characteristic point, a first characteristic amount is calculated for the characteristic point, the prescribed alteration is performed to the respective image, a second characteristic amount is calculated for the characteristic point in the image after the prescribed alteration is performed, and the fluctuated characteristic amount for the characteristic point is computed based on the first characteristic amount and the second characteristic amount.

7. The image-processing method according to claim 6, wherein the computing step includes computing the fluctuated characteristic amounts on a per characteristic point basis, and the retrieving step includes computing a degree of similarity between an evaluation image and a stored image using a characteristic point that has a fluctuated characteristic amount less than or equal to a threshold value.

8. The image-processing method according to claim 6, wherein the prescribed alteration is a process that rotates the input image.

9. The image-processing method according to claim 6, wherein the retrieving step includes outputting the stored image as a retrieval result, according to the degree of similarity.

10. A non-transitory computer-readable recording medium retrievably storing a program for causing a computer to execute the image-processing method according to claim 6.

11. The image-processing method according to claim 6, wherein the group of images includes the input query image.

* * * * *